United States Patent [19]

Fukuhara et al.

[11] Patent Number: 4,776,195
[45] Date of Patent: Oct. 11, 1988

[54] APPARATUS FOR MANUFACTURING CORE WIRE FOR OPTICAL FIBERS

[75] Inventors: Tetsukazu Fukuhara; Masayoshi Kurashige; Yugo Yao; Tokio Sekigawa, all of Hiratsuka, Japan

[73] Assignees: Netsuren Co., Ltd.; Nippon Steel Corporation, both of Tokyo, Japan

[21] Appl. No.: 877,966

[22] Filed: Jun. 24, 1986

[30] Foreign Application Priority Data

Jun. 28, 1985 [JP] Japan .................. 60-140236

[51] Int. Cl.⁴ ............................................. B21B 13/10
[52] U.S. Cl. ............................................ 72/224; 72/78;
29/33 F
[58] Field of Search ................ 29/33 F; 72/224, 366, 72/371, 226, 225, 77, 78

[56] References Cited

U.S. PATENT DOCUMENTS

| 321,478 | 7/1885 | Benton | 72/78 |
| 359,729 | 3/1887 | Lindberg | 72/78 |
| 2,067,972 | 1/1937 | Leech | 72/78 |
| 2,160,268 | 5/1939 | Hunter et al. | 72/78 |
| 4,244,204 | 1/1981 | Vydrin et al. | |

FOREIGN PATENT DOCUMENTS

| 59-39401 | 3/1984 | Japan . |
| 60-37565 | 8/1985 | Japan . |
| 62-2218 | 1/1987 | Japan . |

*Primary Examiner*—W. Donald Bray
*Attorney, Agent, or Firm*—Wenderoth, Lind & Ponack

[57] ABSTRACT

An apparatus for manufacturing a core wire for use in laying optical fibers over a long distance produces a plurality of continuous corrugated deep grooves in a wire that are capable of holding therein the optical fibers longitudinally along the peripheral surface of the wire. An endless raw wire material of circular cross section is formed by the apparatus into a wire of square cross section through plastic processing and thereafter the wire is formed into a core wire of a flower patterned cross section with a plurality of petals having corrugated deep grooves in the periphery thereof continuously longitudinally thereof through a rolling device. In addition, the core wire so constructed is formed into a core wire with spiral corrugated deep grooves formed in the peripheral surface thereof. The rolling means has forming rolls equal in number to the number of ridges of the square wire, and each such roll having two perfect corrugated convex portions formed widthwise on the peripheral surface thereof. All the peripheral surfaces of the forming rolls are directed to a point on the wire travelling path, whereby each ridge of the wire is positioned between the two convex portions of each roll. The torsion processing device advantageously has a freely rotatable rim arranged for taking the core wire travelling path as a tangential line, and the rim is rotatable on the contact point between the core wire travelling path and the rim itself perpendicularly to the surface thereof to permit the core wire to be turned around the peripheral surface thereof.

3 Claims, 4 Drawing Sheets

APPARATUS FOR MANUFACTURING CORE WIRE FOR OPTICAL FIBERS

BACKGROUND OF THE INVENTION

1. Field of the Invention

The present invention relates to a method of and apparatus for manufacturing a core wire for use with optical fibers.

2. Description of the Prior Art

Optical fibers for information transmission are now ready for practical use. A method of laying a plurality of stripes of optical fibers of this type over a long distance is disclosed in Japanese Patent Publication No. 60-37565. This method employs as a core wire a grooved filament composed of a wire of a diameter about 3 to 5 mm having one groove or a plurality of grooves provided in the outer periphery thereof longitudinally therealong. The wire is of a metal such as aluminium, iron and the like or alloys thereof or such plastics as fluorine plastics, etc., or such reinforced plastics as FRP. And, optical fibers are directly, or those coated with synthetic resin are, inserted into the groove or grooves, and the interior of the groove is preferably filled with silicon resin, etc., for holding the optical fibers therein. However, the core wire so structured was manufactured and employed up to now, for example, by merely extruding plastics. The core wire made of plastics has insufficient mechanical strength to resist stretching and bending. Accordingly, there is a need at present to provide a method and apparatus to mass-produce highly accurate core wires made of a metal material having sufficient mechanical strength both inexpensively and with satisfactory yield.

In addition, because there was no demand for the grooved metal strip described above until now, no prior art has been found now as a method of and an apparatus for manufacturing it. Japanese Laid-Open Patent Publication No. 59-39401, for example, discloses a rolling mill having a similar structure, although only in roll arrangement, to a rolling machine according to the present invention. This rolling mill is not adapted to manufacture the grooved strip described above, but merely to manufacture wire materials with circular cross sections. Likewise, Japanese Laid-Open Patent Publication No. 59-39401 discloses a rolling mill for manufacturing a steel bar. This, however, is not adapted to manufacture a grooved wire, too. Another example of the prior art to manufacture the grooved wire of the type above is found in Japanese Patent Publication No. 60-37565, which provides a composite optical fiber overhead line having an optical fiber unit produced by inserting an optical fiber core wire into a groove provided in the outer periphery of a grooved strip and filling the groove with silicone resin.

SUMMARY OF THE INVENTION

It is an object of the present invention to provide a method of and apparatus for manufacturing an optical fiber core wire capable of mass-producing without interruption high precision products with higher yield while employing as a raw material a material of a circular cross section such as, for example, inexpensive steel wires, or plated steel wires, other metal wires, and alloyed metal wires.

Another object of the present invention is to provide a method of and apparatus for manufacturing a core material of continuous form of a cross sectional shape similar to the core wire described above irrespective of the magnitude of a diameter thereof.

The above and other objects, features and advantages of the present invention will become more apparent from the following description when taken in conjunction with the accompanying drawings in which a preferred embodiment of the present invention is shown by way of illustraive example.

DESCRIPTION OF THE PREFERRED EMBODIMENT

A core wire for optical fibers according to the present invention will be described with reference to FIGS. 2 to 4.

Figure 2:
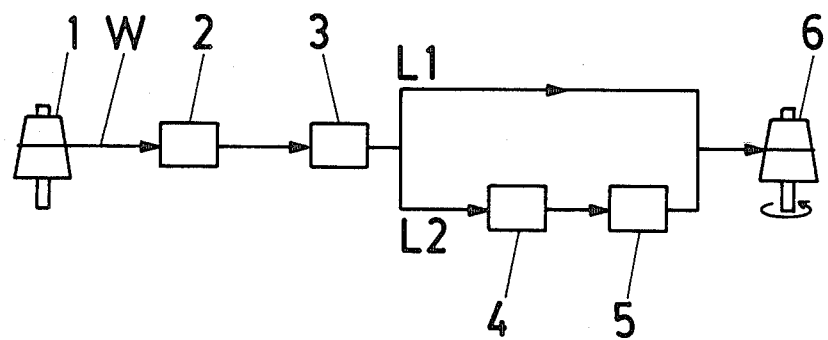
FIG. 2 is a block diagram illustrating whole arrangement of the core wire for the optical fibers according to the present invention.
Figure 3:
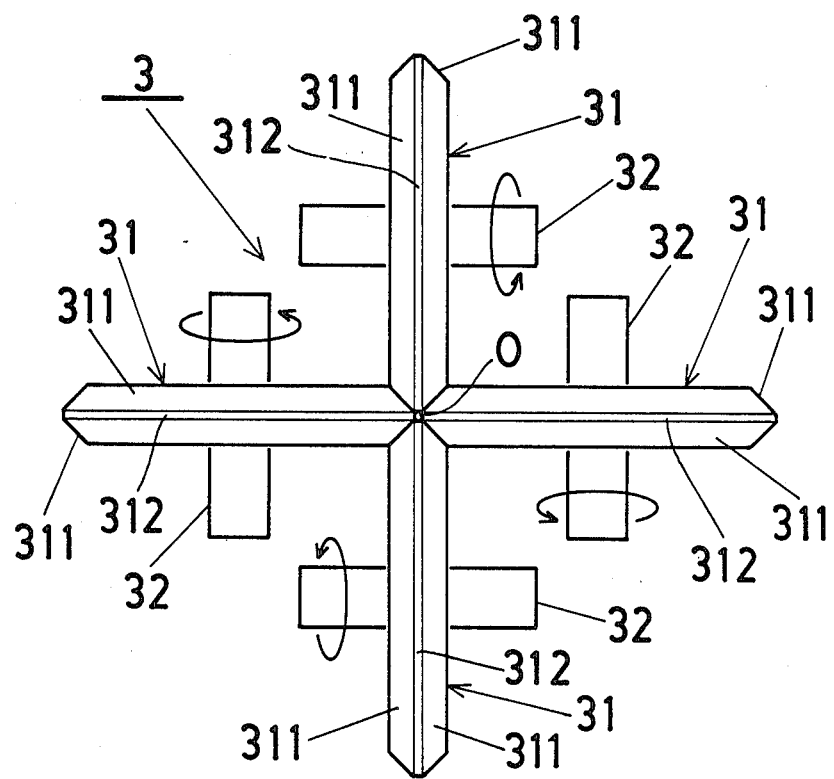
FIG. 3(a) is a plan view illustrating a basic arrangement of a forming roll of a roll forming machine.
FIG. 3(b) is an enlarged cross sectional view illustrating a peripheral surface of the forming roll.

Designated at 1 in FIG. 2 is a unwinding stand, 2 is a square wire forming machine, 3 is a roll forming machine, 4 is a torsion processing machine, 5 is a drive roller, and 6 is a winding stand.

A method of manufacturing a core wire for optical fibers according to the present invention consists of two methods: a first method wherein a raw wire material W of a circular cross section is rendered under plastic processing from the unwinding stand 1 through the square wire forming machine 2 and the roll forming machine 3, and immediately wound on the winding stand 6 as shown by a processing line L1 and a second method wherein, after completing the first method, the wire is further rendered to torsion processing through a processing line L2 equipped with the torsion processing machine 4 and the drive roller 5, and wound on the winding stand 6.

An embodiment for manufacturing a core wire of a flower patterned cross section having eight petals is described hereunder.

The square wire forming machine 2 is well known and, for example, is composed of two pairs of rollers disposed, the one pair following on the heels of the other pair, on a wire feed path. The one pair of the rolls are disposed in parallel to each other spaced right and left in a prescribed interval while the other pair disposed likewise but up and down. An apparatus to subject a wire raw material W of a circular cross section to plastic processing to provide one of a square cross section is well known, the wire raw material W being wound from the unwinding stand 1 and forced to travel in the direction of the roll forming machine 3 under prescribed back-tension. Accordingly, the apparatus is not shown here.

The roll forming machine 3 according to the present invention subjects a square cross section wire W having four ridges into a corrugated irregular flower pattern with eight petals in cross section. The roll forming machine 3 is basically arranged as shown in FIGS. 3(a) and (b).

Figure 3B:
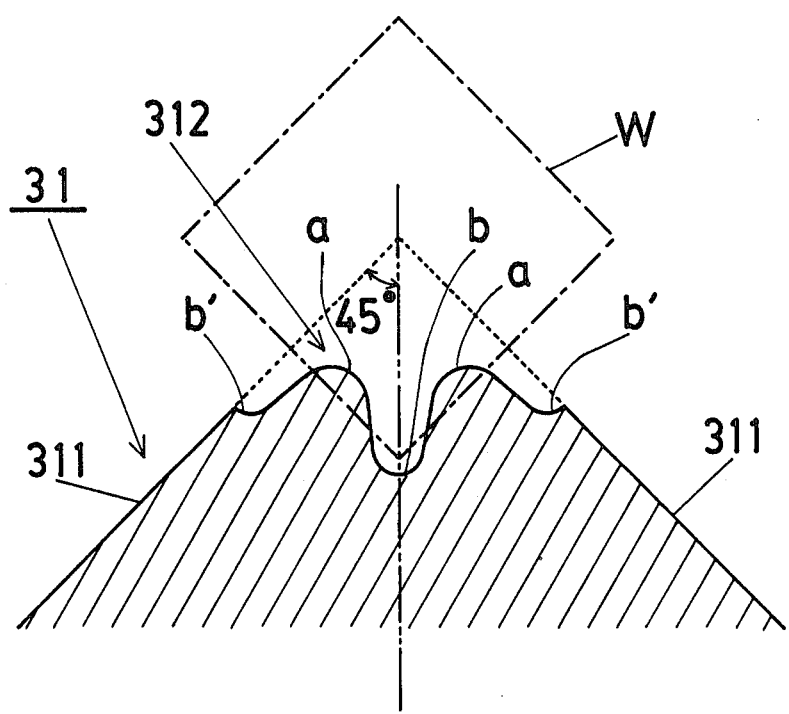

In FIG. 3(a), designated at 31 are four forming rolls each supported on a shaft 32. The rolls 31 are disposed while forming an angle of 90° with each other peripherally of the feed path (O) for the wire W, and driven in synchronism. Both marginal peripheral edges 311 of each of the forming rolls 31 are bevelled to be inclined at an angle of 45° in a peripheral surface direction of the roll, and adjoining edges 311 thereamong are brought into close contact with each other. Accordingly, the roll peripheral surface of the forming roll 31 is sharply narrowed as shown by 312. The narrowed roll peripheral surface 312 has continuous corrugated irregularity of a prescribed cross section as shown in FIG. 3(b). The corrugated irregularity consists of two perfect convex portions (a), a perfect concave portion (b) lying between those convex portions (a), and two semiperfect concave portions (b'). The respective peripheral surfaces 312 are brought together around the feed path as shown in FIG. 3(a) to form a space of a prescribed area, the space being employed as a feed path (O) of a wire material. Thus, the feed path (O) is adapted to have eight wall faces equally angled peripherally thereof. Moreover, the roll forming machine 3, provided that the wire W of a square cross section is fed keeping parallel side surfaces thereof each directed for example horizontally and vertically, is arranged to have the four forming rolls 31 positioned diagonally to four corners of the wire W, i.e., set to have such angles to the square wire forming machine 2 that each of the ridges of the wire W of its cross section shown by one dotted line enters into the square wire forming machine 2 while being located in the vicinity of the concave portion(b) between the convex portions (a) of each of the forming roll 31. Thus, the four rolls, positioned as described above, define a standard roll pass corresponding to the desired cross-sectional shape of the wire materials.

In addition, the cross section of the space formed by gathering the peripheral surfaces of the forming rolls 31, i.e., that of the feed path (O) is set to be less than the cross sectional area of the wire passed through the square wire forming machine 2 by a prescribed amount according to the evaluation derived from a relationship among flexibility of the wire material to be deformed, force to press the wire and tension of the wire as it is wound.

Here, the roll forming machine 3 according to the present invention is characterized as described above, wherein the respective forming rolls 31 are driven in synchronism to each other mechanically with use of known helical years. Therefore, description thereof will be omitted here.

Figure 4:
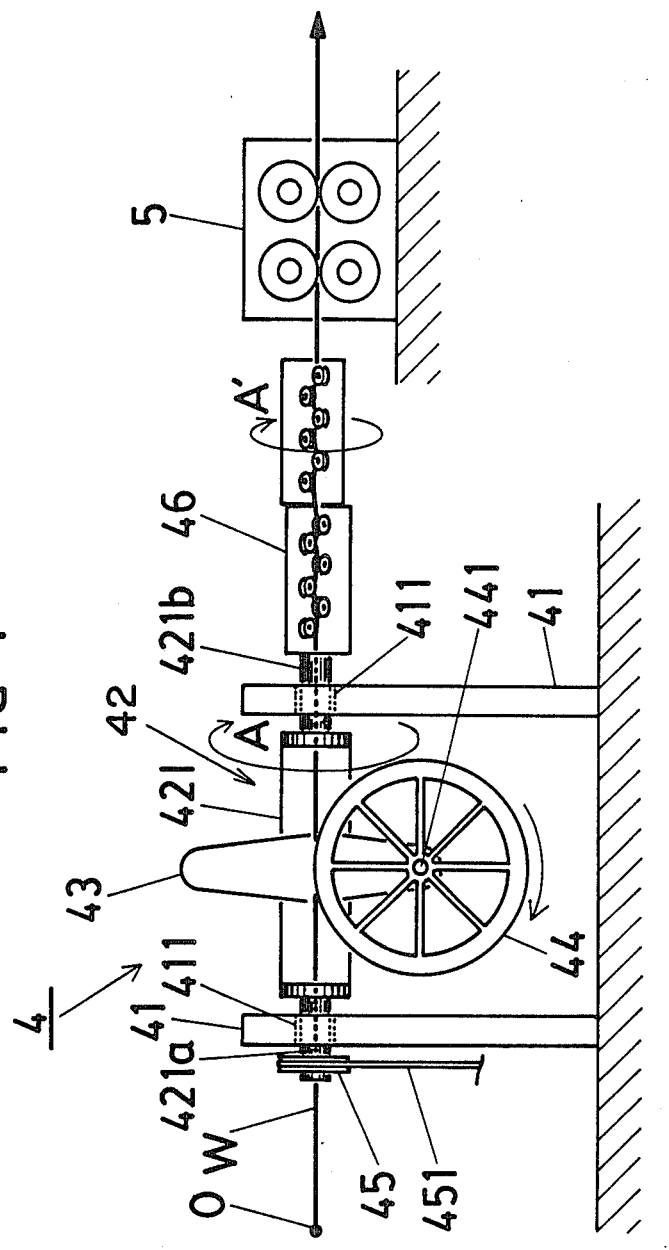
FIG. 4 is a front view, partly fragmented, of a torsion processing machine.

Referring to FIG. 4 illustrating an arrangement of the torsion processing machine 4, supports 41 are provided spaced in a prescribed interval along on the path the wire is fed, which supports have respective throughholes therein along the feed paath for serving as bearings 411 for a rotor 42 described just below.

The rotor 42 comprises for example a plate-shaped portion 421 and shafts 421a, 421b fixedly mounted on both ends of one side surface of the plate-shaped portion 421 with axes of the shafts being aligned. The shafts 421a, 421b of the rotor 42 are respectively supported on the bearings 411. Accordingly, the plate-shaped portion 421 is positioned in the vicinity of the feed path for the wire W keeping a parallel relationship thereto. A rim supporter arm 43 is fixedly mounted at the center of the surface of the plate-shaped portion 421 on one side thereof perpendicularly thereto. Moreover, a throughhole of a prescribed diameter penetrates the shafts 421a, 421b along the axes of the shafts for permitting the wire W to pass therethrough.

A shaft 441 is pivotally fitted in one end of the rim supporter arm 43 and a rim 44 is rotatably supported on the shaft 441. The rim 44 is adapted to have the shaft 441 thereof positioned in the rim supporter arm 43 in response to an outer diameter of the rim 44 such that the rim 44 can assume as a tangent line the feed path (O) for the wire W connecting the respective axes of the shafts 421a, 421b of the rotor 42. In addition, the rim 44 has a peripheral surface including a shallow spiral groove formed therein and wound thereon, for example, in a plurality of turns or a flat bottom groove on a circular-arc groove wound in one turn.

Furthermore, an extension of the rim supporter arm 43 on the other side thereof acts as a balance weight for the weight of the rim 44.

Designated at 45 is a pulley fixedly mounted on the outer periphery of the shaft 421a disposed on the side of the roll forming machine 3. A rotation from a rotating source (not shown) is transmitted to the pulley 45 via a belt 451 for making the rotor 42 rotatable as for example shown by an arrow of (A).

Designated at 46 is an underside wire straightening device fixedly mounted on the end surface of the shaft 421b located oppositely to and connected with the roll forming machine 3. The wire straightening device 46 is made rotatable together with the rotor 42 in the direction of an arrow (A') around the axis of the rotor 42.

The wire W is fed from the throughhole in shaft 421a of rotor 42 disposed on the side of the roll forming machine 3, passes through the throughhole in shaft 421b after going along the groove formed in the peripheral surface of the rim 44 by one turn or by a plurality of turns, and thereafter reaches the drive roller 5 while passing among a group of rollers of the wire straightening device 46.

The drive roller 5 can draw the wire W in the direction shown by the arrow (to the side of the winding stand not shown in FIG. 4).

Hereupon, provided the rotation of the rotor 42 in the direction of the arrow A is synchronized, in a prescribed ratio, with that of the forming rolls 31 of the roll forming machine 3, torsioned with a pitch corresponding to the aforementioned ratio with the delivery side of the forming rolls 31 as a fixed point, torsion can be applied to the wire W between the contacts on the peripheral surface of the forming rolls 31 and the underside wire straightening device 46, by the groove formed in the peripheral surface of the rim 44.

The whole arrangement of the embodiment of the apparatus for manufacturing the core wire for optical fibers according to the present invention is as described above.

Let us here exemplarily describe the manufacture of the core wire for optical fibers in accordance with the processing line L1 with use of a plurality of deep grooves continuously formed linearly longitudinally of the wire W, the grooves being capable of holding the optical fibers.

With the winding stand 6 and the roll forming machine 3 each being rotated at a prescribed speed, a wire material W of a circular cross section wound around the unwinding stand 1 is wound on the winding stand 6, while unwinding the wire in a state headed with prescribed back tension, by successively passing it through the square wire forming machine 2 and the roll forming machine 3. Meanwhile, the wire W is rendered plastic and formed into a square cross section with four ridges or corners while it passes through the square wire forming machine 2, and thereafter adapted to reach the roll forming machine 3. In succession, the wire W passes through the feed path (O) formed by gathering the respective forming rolls 31 of the roll forming machine 3, the rolls being rotated in synchronism with each other. Given that the feed path (O) has its internal wall comprising eight corrugated irregularities, the wire W passing therethrough is successively subjected to plastic processing into a flower patterned cross section with 8 petals.

In the plastic processing with the roll forming machine 3, the roll forming machine 3 has a feed path area set to a prescribed size while the ridges of the wire W passing therethorugh are arranged to be located at the concave portions (b) lying between the two corrugated convex portions (a) formed on the respective peripheral surfaces of the respective forming rolls 31. Accoringly, the ridges of the wire W likely to be elongated under pressure are hindered in the direction of its elongation by the bottom of the concave portion (b). Thus, the wire is uniformly subjected to plastic deformation in conformity with the shape of the feed path (O) surrounded by the eight corrugated irregularities keeping an equal angle peripherally thereof. As a result, the wire enters into a gap where the peripheral edges 311 of the adjoining forming rolls 31 make close contact with each other without the possibility of producing any flash; that is to say wire material squeezed out to form a burr). Furthermore, the wire W has no unreasonable depression force applied to a specific peripheral local portion thereof, and is thus subjected to precision plastic processing over the whole periphery thereof without reducing the mass of the raw material by the processing. In addition, even if the wire material is plated, the material is naturally subjected to plastic deformation, so that the plated portion can satisfactorily follow the plastic deformation without fear of exposure of the raw material.

Figure 1A:
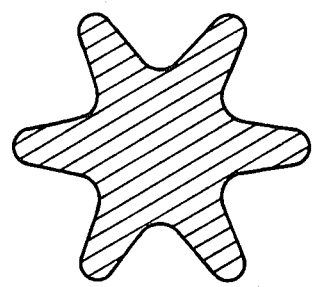
FIGS. 1(a) and 1(b) are cross sectional views of core wires of two types of optical fibers manufactured according to the present invention.
Figure 1B:
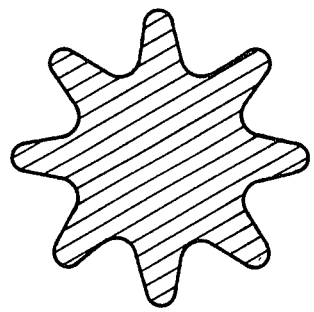
Figure 1C:
FIG. 1(c) and (d) are respective front views of FIGS. 1(a) and 1(b)
Figure 1D:

Let us then describe a procedure of exemplarily manufacturing a core wire for optical fibers according to the present invention, the optical fibers having a plurality of deep grooves formed therein each as shown in FIG. 1(b) and FIG. 1(d) capable of holding the optical fibers therein turned and continued longitudinally of the wire material in a prescribed pitch in conformity with the processing of the line L2.

In this case, the winding stand 6 and the roll forming machine 3 are respectively rotated, while the torsion processing machine 4 is rotated in synchronism, in a prescribed ratio, with the rpm of the roll forming machine 3, the drive roll 5 being furthermore rotated at a prescribed speed. Accordingly, the wire W, after passing through the roll forming machine 3, is subjected to torsion processing while being subjected to traction from the drive roll 5, whereby the traction from the winding stand 6 can be prevented from being cancelled out by the torsion processing machine 3.

After the wire material W of a circular cross section is subjected to plastic processing and formed into a square cross section by the square wire forming machine 2 described above, it is further subjected to plastic processing and formed into a wire of a flower patterned cross section with eight petals through the roll forming machine 3, and in succession forced to advance to the torsion processing machine 4.

The wire W is subjected in succession to natural torsion at a prescribed pitch at the torsion processing machine 4. Then, the wire W is forced to pass among a group of rollers of the wire straighting device 46 and reformed in bending thereof produced in the torsion processing described above. The wire W thus keeping its linearity is wound in succession on the winding stand 6 via the drive roller 5.

Thus, the wire material W of a circular cross section is subjected to precision plastic processing over the whole periphery thereof as well as the torsion processing of a prescribed pitch, and formed into a spiral deeply-grooved core wire of a prescribed flower patterned cross section.

Although, in the embodiment described above, a case of manufacturing a core wire of a flower patterned cross section having eight petals was described, in the case of manufacturing a core wire of a flower patterned cross section with six petals, a wire material of circular cross section may be subjected to plastic processing and formed into a regular triangle through the square wire forming machine 2, and a roll forming machine 3 having the forming rolls 31 around the center of the wire path spaced peripherally thereof in an angle of 120° may be employed. Moreover, in the case of manufacturing in a core wire of a flower patterned cross section with ten petals, a wire materials of a circular cross section may be subjected to plastic processing and formed into a regular pentagon through the square wire forming machine 2, and furthermore a roll forming machine 3 having five forming rolls 31 arranged on the center of the wire path keeping peripherally an angle of 36° may be employed. In all cases, the peripheral edges 311 of the forming rolls 31 have inclined surfaces defining an angle between adjoining ones thereof, formed so as to be capable of making contact with each other. Likewise, in the embodiments described above, two continuous corrugated appearances with two perfect concave portions are formed widthwise on the peripheral surface of the forming roll 31.

The torsion forming machine 4 described above will not be limited to the arrangement shown in the embodiment described above. Namely, given the arrangement of the rim 44 being made rotatable peripherally thereof and being made rotatable perpendicularly to the surface thereof, the present invention may be applied to all arrangements other than the present embodiment.

Although, in the embodiment described above, a case with the wire straightening device 46 was exemplarily described, provided the torsion processing machine 4 does not damage the wire W with respect to its linearity too much, the wire straightening device 46 may be omitted.

In addition, although in the embodiment described above a case with use of a roll-constructed forming machine as the square wire forming machine 2 was described, another plastic processing means capable of square forming processing, such as for example, a pressure roll, a draw die, and the like, may be employed irrespective of forms and means thereof.

It goes without saying that the present invention is applicable not only to core wires for optical fibers of a type described above but to wires in continuous form similar to these core wires for optical fibers each being grooved deeply and continuoulsly in the peripheral surface thereof regardless of the sizes of the wire materials.

According to the present invention, precision core wires for optical fibers can be mass-produced from inexpensive steel wires, plated steel wires, and the like with satisfactory yield to thereby provide valuable core wires for optical fibers which will be employed in the future in great quantities.

Although a certain preferred embodiment has been shown and described, it should be understood that many changes and modifications may be made therein without departing from the scope of the appended claims.

What is claimed is:

1. An apparatus for manufacturing a core wire for optical fibers comprising:

an unwinding stand for supporting and dispensing a wire material of circular cross section wound therearound;

a winding stand for receiving the wire material;

a square wire forming machine disposed between said unwinding stand and said winding stand;

a roll forming machine disposed likewise between said unwinding stand and said winding stand, and including forming rolls for forming the wire material;

means for feeding the wire material along a feed path from said unwinding stand to said square wire forming machine, to said roll forming machine, and to said winding stand;

said square wire forming machine having means for subjecting the circular cross section wire material to plastic deformation and for forming the wire material into square cross section wire material having a prescribed number of ridges;

said forming rolls being equal in number to that of the ridges of the wire material formed by said square wire forming machine, each said forming roll having two continuous corrugated irregularities widthwise of the peripheral surface thereof, said two corrugated irregularities including two convex portions and a concave portion between said two convex portions, each said forming roll having an inclined surface on both sides of a peripheral marginal edge thereof, said forming rolls being positioned around the feed path and defining a roll pass corresponding to the desired cross-sectional shape of the wire material; and said roll forming machine being orientated with respect to the wire material in the wire feed path for receiving the ridges of the wire material coming from said square wire forming machine inside said concave portion of the respective forming rolls.

2. An apparatus for manufacturing a core wire for optical fibers according to claim 1, said apparatus further comprising a torsion processing machine interposed between said roll forming machine and said winding stand, said torsion processing machine having a rotatably attached rim of a prescribed diameter, said rim being located for locating the diameter thereof with the wire feed path as a tangential line thereto, said rim being rotatable for turning wire material travelling along the peripheral surface thereof along the wire feed path by at least one revolution.

3. An apparatus for manufacturing a core wire for optical fibers according to claim 2, further including straightening means for straightening the wire material after the wire material has passed through said torsion processing machine.

* * * * *